United States Patent
Niino et al.

(10) Patent No.: US 8,096,624 B2
(45) Date of Patent: Jan. 17, 2012

(54) BRAKE CONTROL APPARATUS FOR VEHICLE

(75) Inventors: Hiroaki Niino, Toyota (JP); Takashi Sato, Okazaki (JP); Yoichi Miyawaki, Obu (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 1030 days.

(21) Appl. No.: 12/018,680

(22) Filed: Jan. 23, 2008

(65) Prior Publication Data

US 2008/0203812 A1    Aug. 28, 2008

(30) Foreign Application Priority Data

Feb. 27, 2007   (JP) .................. 2007-046647

(51) Int. Cl.
   *B60T 8/42*   (2006.01)
(52) U.S. Cl. ...... 303/115.1; 303/10; 303/87; 303/113.2; 303/115.2; 303/116.1; 303/167; 60/547.1; 701/38
(58) Field of Classification Search ............... 303/152, 303/11, 115.1, 113.2
See application file for complete search history.

(56) References Cited

U.S. PATENT DOCUMENTS

| | | | | |
|---|---|---|---|---|
| 5,310,251 A | * | 5/1994 | Towers et al. | 303/11 |
| 5,529,388 A | * | 6/1996 | Yasui | 303/116.1 |
| 2004/0041470 A1 | * | 3/2004 | Imamura | 303/167 |
| 2005/0269875 A1 | | 12/2005 | Maki et al. | |
| 2006/0181143 A1 | * | 8/2006 | Yamamoto | 303/87 |

FOREIGN PATENT DOCUMENTS

JP    2006-021745 A    1/2006

* cited by examiner

*Primary Examiner* — Robert Siconolfi
*Assistant Examiner* — San Aung
(74) *Attorney, Agent, or Firm* — Buchanan Ingersoll & Rooney PC (57) ABSTRACT

A brake control apparatus for a vehicle includes a first calculating portion for calculating a master cylinder pressure, a first determining portion for determining whether or not the brake operation is performed, a second calculating portion for calculating a target wheel cylinder pressure, a third calculating portion for calculating a controlled pressure, a controlling portion for controlling a pressure difference control valve, a second determining portion for determining whether or not the vehicle is stopped, and a driving portion for specifying a drive pattern of a motor to a first motor drive pattern in a case where the vehicle is not stopped, the motor driving a pump for discharging a brake fluid, the driving means specifying the drive pattern to a second motor drive pattern in a case where the vehicle is stopped, the driving means driving the motor based on the motor driving pattern specified.

6 Claims, 6 Drawing Sheets

FIG. 6B

BRAKE CONTROL APPARATUS FOR VEHICLE

CROSS REFERENCE TO RELATED APPLICATIONS

This application is based on and claims priority under 35 U.S.C. §119 to Japanese Patent Application No. 2007-046647, filed on Feb. 27, 2007, the entire content of which is incorporated herein by reference.

FIELD OF THE INVENTION

This invention generally relates to a brake control apparatus for a vehicle. More particularly, this invention pertains to a brake control apparatus for a vehicle that can generate a braking force at a wheel by applying a controlled pressure produced by means of a driving of a pump to a wheel cylinder (hereinafter referred to as a W/C) in addition to a basic fluid pressure generated at a master cylinder (hereinafter referred to as a M/C).

BACKGROUND

A known brake control apparatus for a vehicle is disclosed, for example, in JP2006-21745A. The brake control apparatus for a vehicle disclosed can generate a high wheel cylinder pressure (hereinafter referred to as a W/C pressure) by applying a basic fluid pressure generated at a M/C to each W/C and a controlled pressure generated by means of a driving of a pump that is activated by a motor to thereby achieve a large braking force at a wheel. At a time of braking of the vehicle, the controlled pressure in addition to the basic fluid pressure is generated so that a high braking force is achieved. After the vehicle is stopped, the activation of the motor is cancelled so that the operation of the pump is terminated.

However, in the cases where the operation of the pump is stopped after the vehicle is stopped, no flow of brake fluid occurs through the pump at a time a driver further depresses a brake pedal without releasing it. In addition, since a pressure difference control valve provided between the M/C and each of the W/Cs is brought to a pressure difference generating state so that the controlled pressure can be applied to the W/Cs, flow of brake fluid is not sufficiently supplied by the pressure difference control valve. Thus, the driver may feel like depressing a hard or stiff plate when further depressing the brake pedal (i.e., very stiff brake pedal feel because a brake pedal stroke is hardly produced when the brake pedal is depressed). As a result, a brake pedal feel may be impaired and a further depression of the brake pedal may be difficult.

In order to avoid deterioration of brake pedal feel by eliminating the aforementioned very stiff brake pedal feel or to facilitate the further depression of the brake pedal, it is considered to drive the pump even after the vehicle is stopped. However, continuous activation of the motor may cause an increase in current consumption.

A need thus exists for a brake control apparatus for a vehicle which is not susceptible to the drawback mentioned above.

SUMMARY OF THE INVENTION

According to an aspect of the present invention, a brake control apparatus for a vehicle includes a first calculating portion for calculating a master cylinder pressure generated at a master cylinder in response to a brake operation of a vehicle, a first determining portion for determining whether or not the brake operation is performed, a second calculating portion for calculating a target wheel cylinder pressure applied to a wheel cylinder based on the master cylinder pressure calculated by the first calculating portion, a third calculating portion for calculating a controlled pressure applied to the wheel cylinder in addition to the master cylinder pressure based on the master cylinder pressure calculated by the first calculating portion and the target wheel cylinder pressure calculated by the second calculating portion, a controlling portion for controlling a pressure difference control valve arranged between the master cylinder and the wheel cylinder based on the controlled pressure calculated by the third calculating portion in a case where the first determining portion determines that the brake operation is performed, a second determining portion for determining whether or not the vehicle is stopped, and a driving portion for specifying a drive pattern of a motor to a first motor drive pattern by which the motor is continuously activated in a case where the second determining portion determines that the vehicle is not stopped, the motor driving a pump for discharging a brake fluid between the pressure difference control valve and the wheel cylinder. The driving portion specifies the drive pattern to a second motor drive pattern by which the motor is alternately activated and deactivated in a case where the second determining portion determines that the vehicle is stopped. The driving portion drives the motor based on the motor driving pattern specified.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Embodiments of the present invention will be explained with reference to the attached drawings. In the embodiments

First Embodiment

Figure 1:
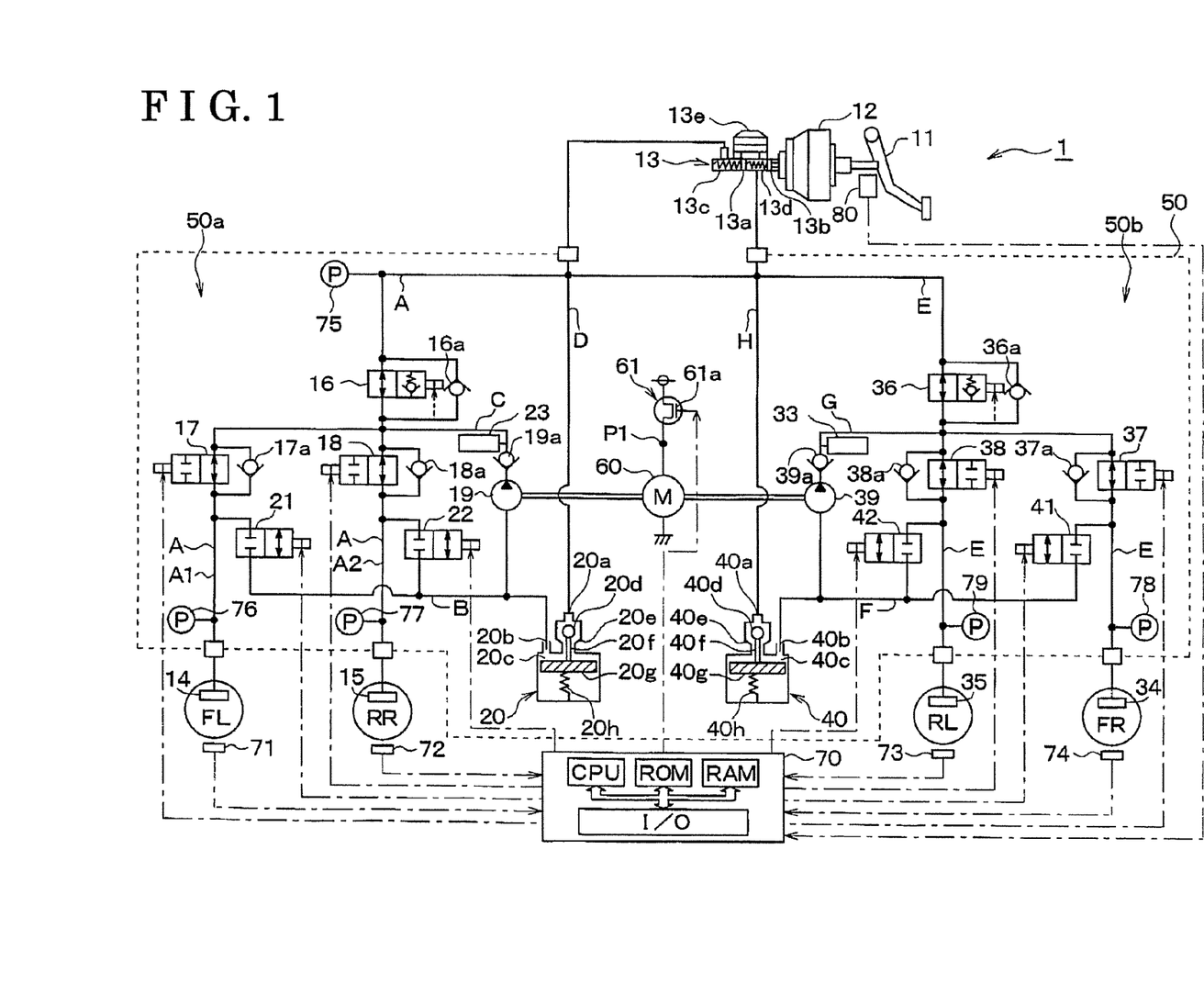
FIG. 1 is a schematic view illustrating an entire configuration of a brake control system for a vehicle according to embodiments of the present invention.

A first embodiment of the present invention will be explained below. FIG. 1 is a schematic view illustrating an entire configuration of a brake control system for a vehicle 1 (hereinafter simply referred to as a brake control system 1) according to the first embodiment.

As illustrated in FIG. 1, the brake control system 1 includes a brake pedal 11, a booster 12, a master cylinder 13 (hereinafter referred to as a M/C 13), wheel cylinders 14, 15, 34, and 35 (hereinafter referred to as W/Cs 14, 15, 34, and 35), a brake fluid pressure control actuator 50 (hereinafter referred to as a brake ACT 50), and a brake ECU 70.

The brake pedal 11 is connected to the booster 12 and the M/C 13 each serving as a brake fluid pressure generating source. In the cases where a driver depresses the brake pedal 11, the depressing force applied to the brake pedal 11 is boosted by means of the booster 12 to thereby press master pistons 13a and 13b provided at the M/C 13. The M/C 13 includes a primary chamber 13c and a secondly chamber 13d. The master piston 13b is provided between the secondary chamber 13d and the booster 12. The master piston 13a separates the primary chamber 13c from the secondary chamber 13d. Therefore, the same level of pressure of the M/C (hereinafter referred to as a M/C pressure) is generated at the primary chamber 13c and the secondary chamber 13d by the master pistons 13a and 13b being pressed by the boosted depressing force. Further, the M/C 13 is so configured that the M/C pressure is transmitted to each of the W/Cs 14, 15, 34 and 35 through the brake ACT 50.

The M/C 13 includes a master reservoir 13e including passages connected to the primary chamber 13c and the secondary chamber 13d, respectively. The master reservoir 13e supplies brake fluid to the primary and secondary chambers 13c and 13d, and/or stores excess brake fluid within the primary and secondary chambers 13c and 13d by means of the passages.

The brake ACT 50 is configured to include a first hydraulic circuit 50a and a second hydraulic circuit 50b. The first hydraulic circuit 50a controls a brake fluid pressure applied to a front-left wheel FL and a rear-right wheel RR while the second hydraulic circuit 50b controls the brake fluid pressure applied to a front-right wheel FR and a rear-left wheel RL. That is, the brake control system 1 forms an X-type dual circuit constituted by the first and second hydraulic circuits 50a and 50b.

The first hydraulic circuit 50a and the second hydraulic circuit 50b have substantially the same configurations and functions. Therefore, only the first hydraulic circuit 50a will be explained below and the explanation of the second hydraulic circuit 50b will be omitted.

The first hydraulic circuit 50a includes a conduit A serving as a main conduit through which the aforementioned M/C pressure is transmitted to the W/C 14 provided at the front-left wheel FL, and to the W/C 15 provided at the rear-right wheel RR. A wheel cylinder pressure (hereinafter referred to as a W/C pressure) is generated at each of the W/Cs 14 and 15 through the conduit A.

The conduit A includes a first pressure difference control valve 16 that is controllable between a fluid communicating state and a pressure difference generating state. When the first pressure difference control valve 16 is in the fluid communicating state, flow of the brake fluid in the conduit A is established, or fluid communication between the M/C 13 and the W/Cs 14 and 15 is established. When the first pressure difference control valve 16 is in the pressure difference generating state, pressure difference between the M/C pressure and the W/C pressure of each of the W/Cs 14 and 15 is generated. The first pressure difference control valve 16 that is normally in the fluid communicating state is brought to the pressure difference generating state when an electric current is supplied to a solenoid coil provided at the first pressure difference control valve 16. In addition, a value of pressure difference produced by the first pressure difference control valve 16 corresponds to a value of electric current supplied to the solenoid coil. That is, the value of pressure difference increases in association with an increase of the value of electric current.

When the first pressure difference control valve 16 is in the pressure difference generating state, the brake fluid is allowed to flow in a direction only from the W/Cs 14 and 15 to the M/C 13 only in a case where the brake fluid pressure at each of the W/Cs 14 and 15, precisely, the W/C pressure of one of the W/Cs 14 and 15, is higher than the M/C pressure by a predetermined level, for example. Accordingly, in order to protect each conduit, the brake fluid pressure at each of the W/Cs 14 and 15 is generally maintained so as not to exceed the M/C pressure by the predetermined level.

The conduit A is split into two conduits A1 and A2 at a downstream side of the first pressure difference control valve 16 close to the W/Cs 14 and 15. As illustrated in FIG. 1, a first pressure increasing control valve 17 is provided at the conduit A1 for controlling an increase of the brake fluid pressure applied to the W/C 14 while a second pressure increasing control valve 18 is provided at the conduit A2 for controlling the increase of the brake fluid pressure applied to the W/C 15.

The first and second pressure increasing control valves 17 and 18 are each constituted by a solenoid valve functioning as a two-position valve that can be controlled between a fluid communicating state (i.e., open state) and a fluid communication interrupting state (i.e., closed state). For example, when the pressure increasing control valve 17 is in the fluid communicating state, the flow of brake fluid within the conduit A1 is established. Further, for example, when the pressure increasing control valve 17 is in the fluid communication interrupting state, the flow of brake fluid within the conduit A1 is interrupted. In the cases where the first and second pressure increasing control valves 17 and 18 are each controlled to be in the open state, the M/C pressure and/or the brake fluid pressure obtained through a discharge of brake fluid from a pump 19 (to be explained later) can be applied to each of the W/Cs 14 and 15.

The first and second pressure increasing control valves 17 and 18 are each brought to the open state in the cases where no control current is supplied to a solenoid coil provided at each of the first and second pressure increasing control valves 17 and 18 (i.e., de-energized state). On the other hand, the first and second pressure increasing control valves 17 and 18 are each brought to the closed state in the cases where the control current is supplied to each solenoid coil (i.e., energized state). That is, the first and second pressure increasing control valves 17 and 18 are each of a normal open type.

As illustrated in FIG. 1, check valves 16a, 17a, and 18a are provided at the first pressure difference control valve 16, the first pressure increasing control valve 17, and the second pressure increasing control valve 18, respectively. Precisely, the check valve 16a is arranged so as to be parallel to the first pressure difference control valve 16. Similarly, the check valve 17a is arranged so as to be parallel to the pressure increasing control valve 17, and the check valve 18a is arranges so as to be parallel to the pressure increasing control valve 18.

A first pressure decreasing control valve 21 and a second pressure decreasing control valve 22 are provided at a conduit B serving as a pressure decreasing conduit. The conduit B is arranged so as to connect a pressure regulation reservoir 20 and a portion on the conduit A between the first pressure increasing control valve 17 and the W/C 14, and to connect the pressure regulation reservoir 20 and a portion on the conduit A between the second pressure increasing control valve 18 and the W/C 15. The first and second pressure decreasing control valves 21 and 22 are each constituted by a solenoid valve functioning as a two-position valve that can be controlled between a fluid communicating state (i.e., open state) and a fluid communication interrupting state (i.e., closed state). The first and second pressure decreasing control valves 21 and 22 are each brought to the closed state in the cases where no control current is supplied to a solenoid coil provided at each of the first and second pressure decreasing control valves 21 and 22 (i.e., de-energized state). On the other hand, the first and second pressure decreasing control valves 21 and 22 are each brought to the open state in the cases where the control current is supplied to each solenoid coil (i.e., energized state). That is, the first and second pressure decreasing control valves 21 and 22 are each of a normal close type.

A conduit C serving as a reflux conduit is provided so as to connect the pressure regulation reservoir 20 and the conduit A. Then, the self-suction pump 19 driven by a motor 60 is provided at the conduit C so as to suction the brake fluid from the pressure regulation reservoir 20 and to discharge the brake fluid towards the M/C 13 or the W/Cs 14 and 15. A battery voltage applied to the motor 60 is controlled by means of an on and off of a semiconductor switch 61a provided at a motor relay 61.

A check valve 19a is provided in the vicinity of an outlet of the pump 19 for the purposes of preventing an application of highly pressurized brake fluid to the pump 19. In addition, in order to reduce pulsation of brake fluid discharged from the pump 19, a damper 23 is arranged at the conduit C in the vicinity of the outlet of the pump 19.

A conduit D serving as an auxiliary conduit is provided so as to connect the pressure regulation reservoir 20 and the M/C 13. The pump 19 suctions the brake fluid from the M/C 13 through the conduit D and discharges the brake fluid to the conduit A to thereby supply the brake fluid to the W/Cs 14 and 15 at a time a controlled pressure (i.e., brake fluid pressure obtained through a discharge of brake fluid from the pump 19) is added to a basic fluid pressure (i.e., brake fluid pressure generated at the M/C). As a result, an increase of the W/C pressure is achieved.

The pressure regulation reservoir 20 includes a reservoir chamber 20c, a reservoir hole 20a, and a reservoir hole 20b. The pressure regulation reservoir 20 receives the brake fluid from the M/C 13 through the reservoir hole 20a through which the pressure regulation reservoir 20 is connected to the conduit D. The pressure regulation reservoir 20 receives the brake fluid from the W/Cs 14 and 15 through the reservoir hole 20b through which the pressure regulation reservoir 20 is connected to the conduits B and C. Further, the pressure regulation reservoir 20 supplies the brake fluid to the pump 19 through an inlet of the pump 19 through the reservoir hole 20b. The brake fluid flows in/out of the reservoir chamber 20c through the reservoir holes 20a and 20b. A ball valve 20d is arranged at a position between the reservoir hole 20a and the reservoir chamber 20c so as to be positioned close to the reservoir hole 20a. An individual rod 20f is provided at the ball valve 20d. The rod 20f makes a movement with a certain stroke in order to move the ball valve 20d up and down. Further, a piston 20g and a spring 20h are provided within the reservoir chamber 20c. The piston 20g moves up and down in conjunction with movement of the rod 20f. The spring 20h generates force for pressing the piston 20g towards the ball valve 20d in order to discharge the brake fluid stored in the reservoir chamber 20c.

In the cases where a predetermined amount of brake fluid is stored within the pressure regulation reservoir 20 having the aforementioned configuration, the ball valve 20d is seated on a valve seat 20e so that the brake fluid is prevented from flowing into the pressure regulation reservoir 20. Hence, the brake fluid beyond a suction capacity of the pump 19 does not flow into the pressure regulation reservoir 20. As a result, a high pressure is not applied in the vicinity of the inlet of the pump 19.

As mentioned above, the second hydraulic circuit 50b has substantially the same configuration as the first hydraulic circuit 50a. That is, a second pressure difference control valve 36 and a check valve 36a correspond to the first pressure difference control valve 16 and the check valve 16a, respectively. Third and fourth pressure increasing control valves 37 and 38, and check valves 37a and 38a correspond to the pressure increasing control valves 17 and 18, and the check valves 17a and 18a, respectively. Further, third and fourth pressure decreasing control valves 41 and 42 correspond to the pressure decreasing control valves 21 and 22, respectively. A pressure regulation reservoir 40 and components 40a to 40h included in the reservoir 40 correspond to the reservoir 20 and the components 20a to 20h included in the reservoir 20. A pump 39 and check valve 39a correspond to the pump 19 and the check valve 19a. A dumper 33 corresponds to the dumper 23. Conduits E, F, G and H correspond to the conduits A, B, C and D, respectively. The hydraulic circuit of the brake control system 1 is configured in the above manner, accordingly.

The brake ECU 70 controlling the brake control system 1 corresponds to a brake control apparatus for a vehicle according to the present embodiment. The brake ECU 70 is constituted by a well-known microcomputer including a central processing unit (CPU), a read-only memory (ROM), a random access memory (RAM), input-output (I/O) and the like. The brake ECU 70 performs various calculations based on a program stored in the ROM, and the like.

Precisely, the brake ECU 70 receives detection signals from wheel speed sensors 71 to 74, a master cylinder pressure sensor (M/C pressure sensor) 75, and wheel cylinder pressure sensors (W/C pressure sensors) 76 to 79. The wheel speed sensors 71 to 74 each serving as second determining means are provided at the wheels FL, FR, RL, and RR, respectively. The M/C pressure sensor 75 serving as first calculating means detects the brake fluid pressure that corresponds to the M/C pressure generated at the M/C 13. The W/C pressure sensors 76 to 79 each detects the brake fluid pressure that corresponds to the W/C pressure generated at each of the W/Cs 14, 15, 34, and 35. The brake ECU 70 also receives an on/off signal from a stop switch 80 serving as first determining means and indicating an operating state of the brake pedal 11. The brake ECU 70 regulates the controlled pressure based on the aforementioned signals. That is, the brake ECU 70 controls the control valves 16 to 18, 21, 22, 36 to 38, 41, 42, and the motor 60 that drives the pumps 19 and 39. The W/C pressure generated at each of the W/Cs 14, 15, 34, and 35 is regulated, accordingly.

The brake control system 1 according to the present embodiment is constituted in the aforementioned manner. Next, a detailed operation of the brake control system 1 will be explained with reference to FIG. 2 that illustrates a flowchart for controlling or regulating the controlled pressure. The brake control system 1 according to the present embodiment can perform not only a normal braking but also a controlled braking such as an anti-skid control. Basic operations of such braking are the same as those of a conventional system. Thus, a regulation of the controlled pressure upon braking and stopping of the vehicle related to a feature of the present embodiment will be explained below.

In step 100 in FIG. 2, the brake ECU 70 receives or inputs detection signals from the wheel speed sensors 71 to 74, the M/C pressure sensor 75, and the W/C pressure sensors 76 to 79 and then calculates a wheel speed, a vehicle speed, a M/C pressure, and an actually applied W/C pressure (hereinafter referred to as an "actual W/C pressure") on the basis of the input detection signals. In addition, the brake ECU 70 receives or inputs an on/off signal from the stop switch 80 so as to detect an operating state of the brake pedal 11. The vehicle speed is obtained by a known method based on the wheel speed. Step 100 serves as the first calculating means.

Next, in step 110, it is determined whether or not the brake operation is performed. Whether or not the brake operation is performed is determined on the basis of an on/off signal of the stop switch 80. In the cases where the stop switch 80 is turned on, it is determined that the brake operation is performed. On the other hand, in the cases where the stop switch 80 is turned off, it is determined that the brake operation is not performed. When the brake operation is not performed, an activation of the motor 60 to operate the pumps 19 and 39 is not required. Thus, a process proceeds to step 120 in which the driving of the motor 60 is cancelled so as to terminate the present routine. On the other hand, when the brake operation is performed, the process proceeds to step 130. Step 110 serves as the first determining means.

In step 130, a target W/C pressure in response to the M/C pressure obtained in step 100, and a controlled pressure are calculated. The target W/C pressure in response to the M/C pressure is calculated on the basis of an arithmetic expression or a map indicating a relationship between the M/C pressure and the target W/C pressure. For example, the target W/C pressure is calculated to be a predetermined ratio relative to the M/C pressure. The controlled pressure is a fluid pressure applied to each of the W/Cs 14, 15, 34, and 35 in addition to the M/C pressure serving as the basic fluid pressure. The controlled pressure is generated by means of operations of the pumps 19 and 39. Accordingly, a difference value between the target W/C pressure and the M/C pressure corresponds to a value of the controlled pressure. Step 130 serves as second and third calculating means.

In step 140, a supply of electric current to the solenoid coil provided at each of the control valves is regulated. Precisely, a desired pressure difference is generated by bringing the first and second pressure difference control valves 16 and 36 each to the pressure difference generating state. Next, in step 150, it is determined whether or not the vehicle is stopped. For example, when the vehicle speed calculated in step 100 is equal to zero, it is determined that the vehicle is stopped. Step 140 serves as controlling means, and step 150 serves as the second determining means.

In the cases where it is determined that the vehicle is not stopped in step 150, the process proceeds to step 160 in which a motor drive pattern A (first motor drive pattern) is specified (i.e., selected). On the other hand, in the cases where it is determined that the vehicle is stopped in step 150, the process proceeds to step 170 in which a motor drive pattern B (second motor drive pattern) is specified (i.e., selected). Step 160 and step 170 each serve as driving means.

Figure 3A:
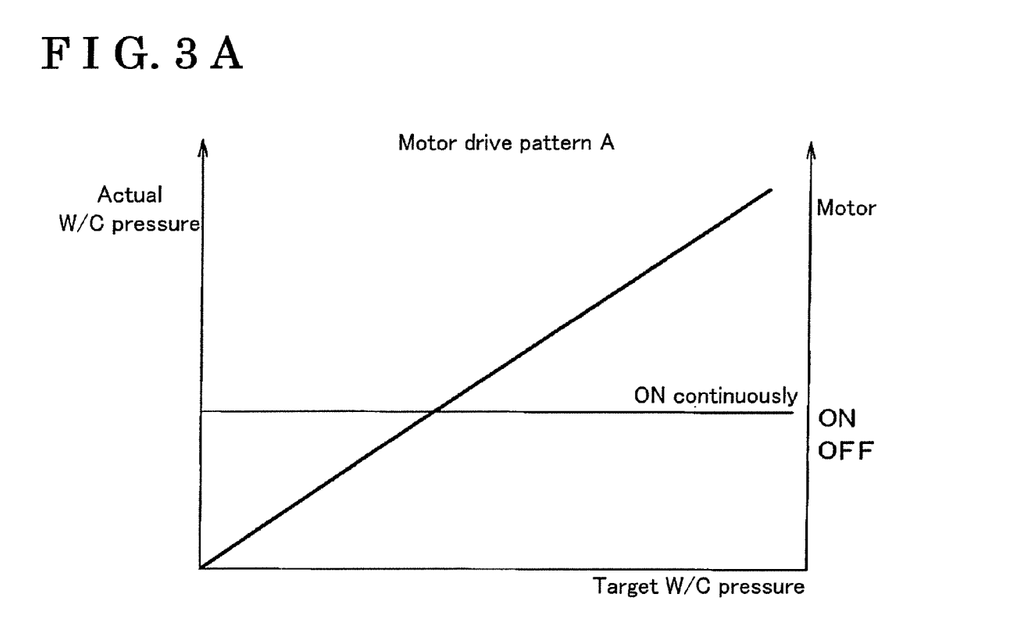
FIG. 3A is a graph illustrating a relationship between an on/off state of a motor relative to a target W/C pressure and an actual W/C pressure in a motor drive pattern A according to first and second embodiments of the present invention.

FIG. 3A is a graph illustrating a relationship between an on/off state of the motor 60 relative to the target W/C pressure and the actual W/C pressure according to the motor drive pattern A. In the same way, FIG. 3B is a graph illustrating a relationship between an on/off state of the motor 60 relative to the target W/C pressure and the actual W/C pressure according to the motor drive pattern B.

According to the motor drive pattern A as illustrated in FIG. 3A, the motor 60 is continuously turned on, i.e., activated, at a time of braking of the vehicle. In the cases where the motor drive pattern A is selected, a signal for turning on the semiconductor switch 61a provided at the motor relay 61 is output from the brake ECU 70 to thereby continuously activate the motor 60. Thus, the actual W/C pressure continuously increases in association with an increase of a calculated value of the target W/C pressure. As a result, the actual W/C pressure and the target W/C pressure becomes substantially equal to each other.

Figure 3B:
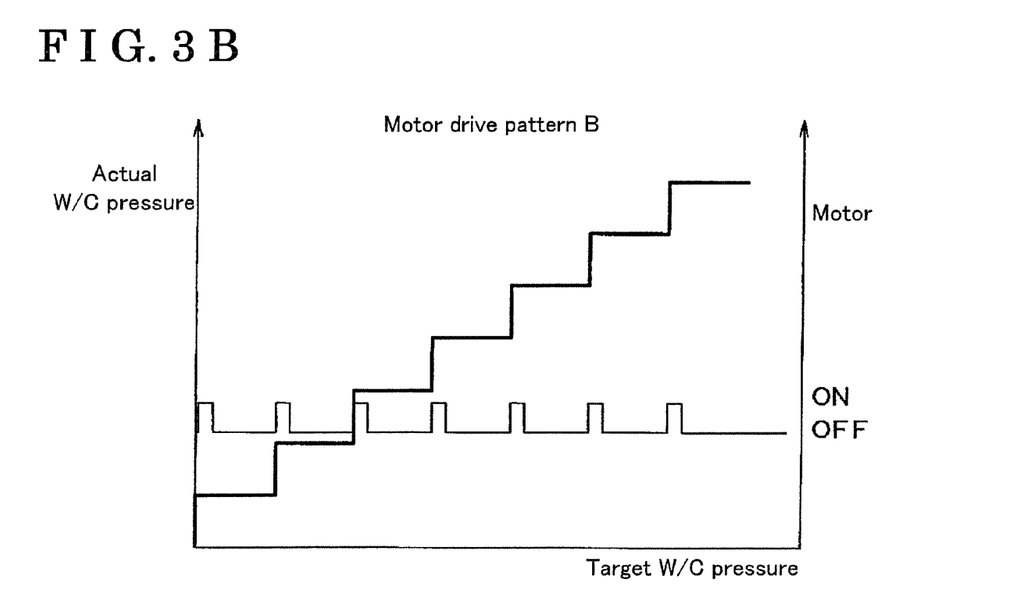
FIG. 3B is a graph illustrating a relationship between an on/off state of a motor relative to a target W/C pressure and an actual W/C pressure in a motor drive pattern B according to first and second embodiments of the present invention.

On the other hand, according to the motor drive pattern B as illustrated in FIG. 3B, a timing for activating the motor 60 is decided beforehand relative to the target W/C pressure. When the timing is met, a signal for turning on the semiconductor switch 61a is output from the brake ECU 70 to thereby activate the motor 60 or otherwise the motor 60 is not activated.

Precisely, predetermined values of the target W/C pressure used for activating the motor 60 are stored beforehand in a memory such as ROM, and the like of the brake ECU 70. Then, only when the target W/C pressure reaches one of the predetermined values, a signal for turning on the semiconductor switch 61a provided at the motor relay 61 is output. In the cases where the target W/C pressure is not equal to any one of the predetermined values, the motor 60 is prevented from being turned on. Accordingly, the motor 60 is continuously controlled in such a way that the motor 60 is activated each time the target W/C pressure reaches one of the multiple predetermined values that are stored beforehand and is then deactivated.

At this time, following conditions may be considered for canceling the activation of the motor 60:
1. The motor 60 is activated when a calculated value of the target W/C pressure is within a predetermined range and is then deactivated (i.e., activation of the motor 60 is cancelled) when a calculated value of the target W/C pressure is out of the predetermined range; 2. The motor 60 is deactivated after a predetermined time has elapsed from the start of activation of the motor 60; 3. The motor 60 is deactivated when the actual W/C pressure reaches a predetermined threshold value.

In the condition of the above condition No. 3, the aforementioned predetermined threshold value may be defined to be the target W/C pressure, a value smaller than the target W/C pressure by a predetermined value, or the like. Then, for example, the motor 60 is deactivated when the actual W/C pressure reaches the target W/C pressure, or a difference between the target W/C pressure and the actual W/C pressure reaches a predetermined value.

In the cases where the motor drive pattern A is selected in step 160 in the aforementioned manner, the present routine is terminated. On the other hand, in the cases where the motor drive pattern B is selected in step 170, the process proceeds to step 180.

In step 180, it is determined whether or not the actual W/C pressure is smaller than an upper limit value Pth. When it is determined that the actual W/C pressure is smaller than the upper limit value Pth, the present routine is terminated. In the cases where the actual W/C pressure reaches the upper limit value Pth, the process proceeds to step 120 in which the activation of the motor 60 is terminated.

Figure 4A:
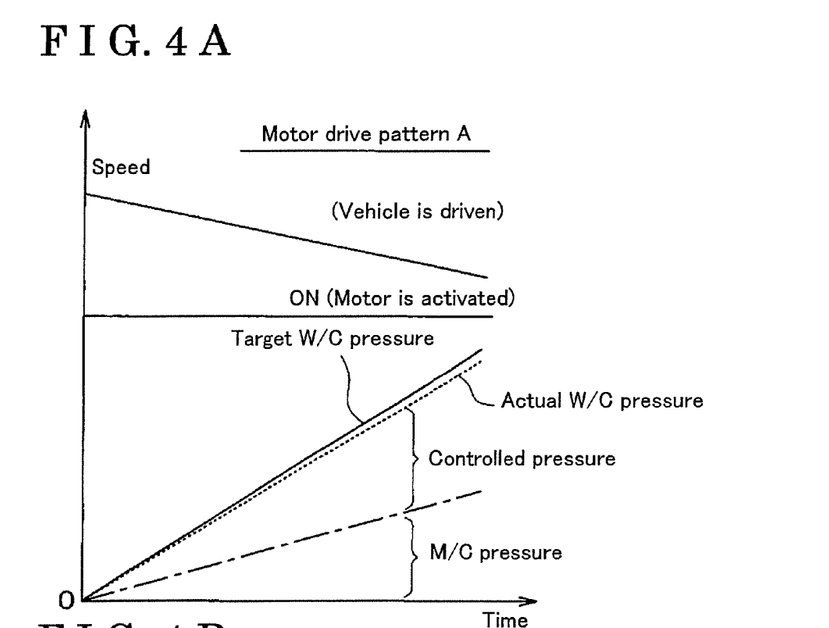
FIG. 4A is a timing chart in the cases where the motor drive pattern A is selected at a time of braking of the vehicle according to the first embodiment of the present invention.
Figure 4B:
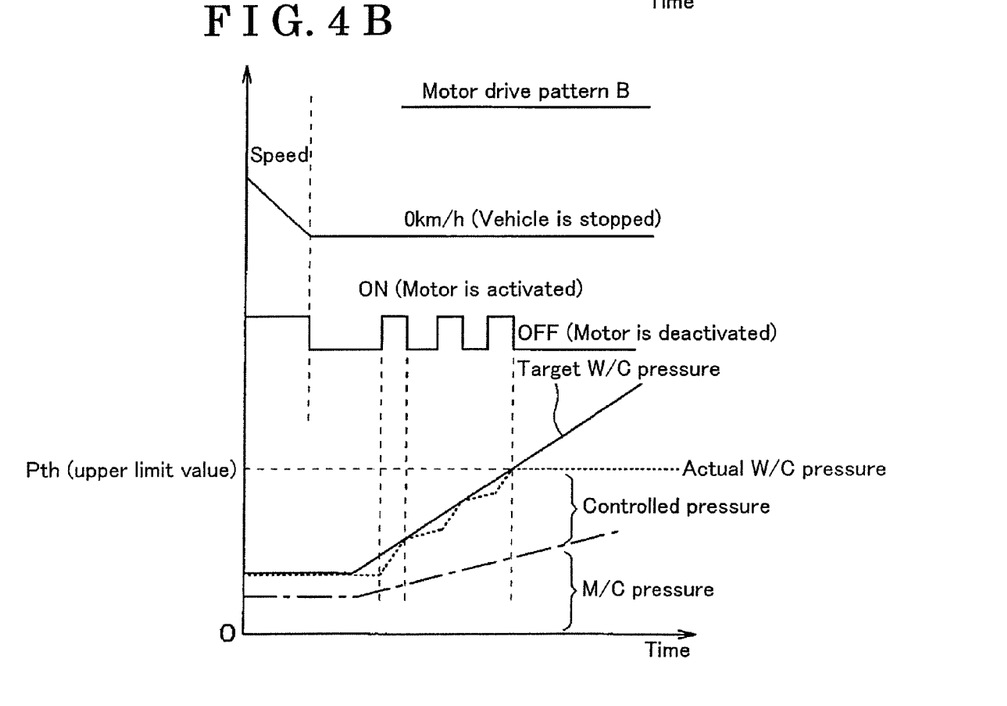
FIG. 4B is a timing chart in the cases where the motor drive pattern B is selected after the vehicle is stopped according to the first embodiment of the present invention.

Timing charts in the cases where the controlled pressure is regulated in the aforementioned manner are illustrated in FIGS. 4A and 4B. FIG. 4A is a timing chart in the cases where the motor drive pattern A is selected at the time of braking of the vehicle while FIG. 4B is a timing chart in the cases where the motor drive pattern B is selected after the vehicle is stopped.

As illustrated in FIG. 4A, the motor 60 is continuously activated at the time of braking. Thus, in association with an increase of the M/C pressure, the controlled pressure applied to each of the W/Cs 14, 15, 34, and 35 by the pumps 19 and 39 that are driven by the motor 60 increases. Thus, the target W/C pressure and the actual W/C pressure become substantially equal to each other.

On the other hand, as illustrated in FIG. 4B, the motor 60 is activated only when the target W/C pressure reaches one of the predetermined values after the vehicle is stopped. In this case, the controlled pressure actually applied to each of the W/Cs 14, 15, 34, and 35 changes in a stepped manner. That is, though the controlled pressure does not linearly follow the target W/C pressure, the controlled pressure increases in the stepped manner so as not to greatly deviate from the target W/C pressure. Accordingly, because of the pumps 19 and 39 operating by means of the activation of the motor 60, a driver is prevented from feeling like depressing a hard or stiff plate when further depressing the brake pedal 11 (i.e., very stiff brake pedal feel because a brake pedal stroke is hardly produced when the brake pedal is depressed). At the same time, deterioration of brake pedal feel as well as an increase of the current consumption because of the continuous activation of the motor 60 can be avoided.

Second Embodiment

A second embodiment of the brake control apparatus for a vehicle will be explained below. The second embodiment is different from the first embodiment in view of the activation method of the motor 60 at a time the motor drive pattern B is selected. A structure of the brake control system 1 and a regulation method of the controlled pressure performed by the brake ECU 70 according to the second embodiment are the same as those according to the first embodiment and thus only a different point will be explained below.

Figure 2:
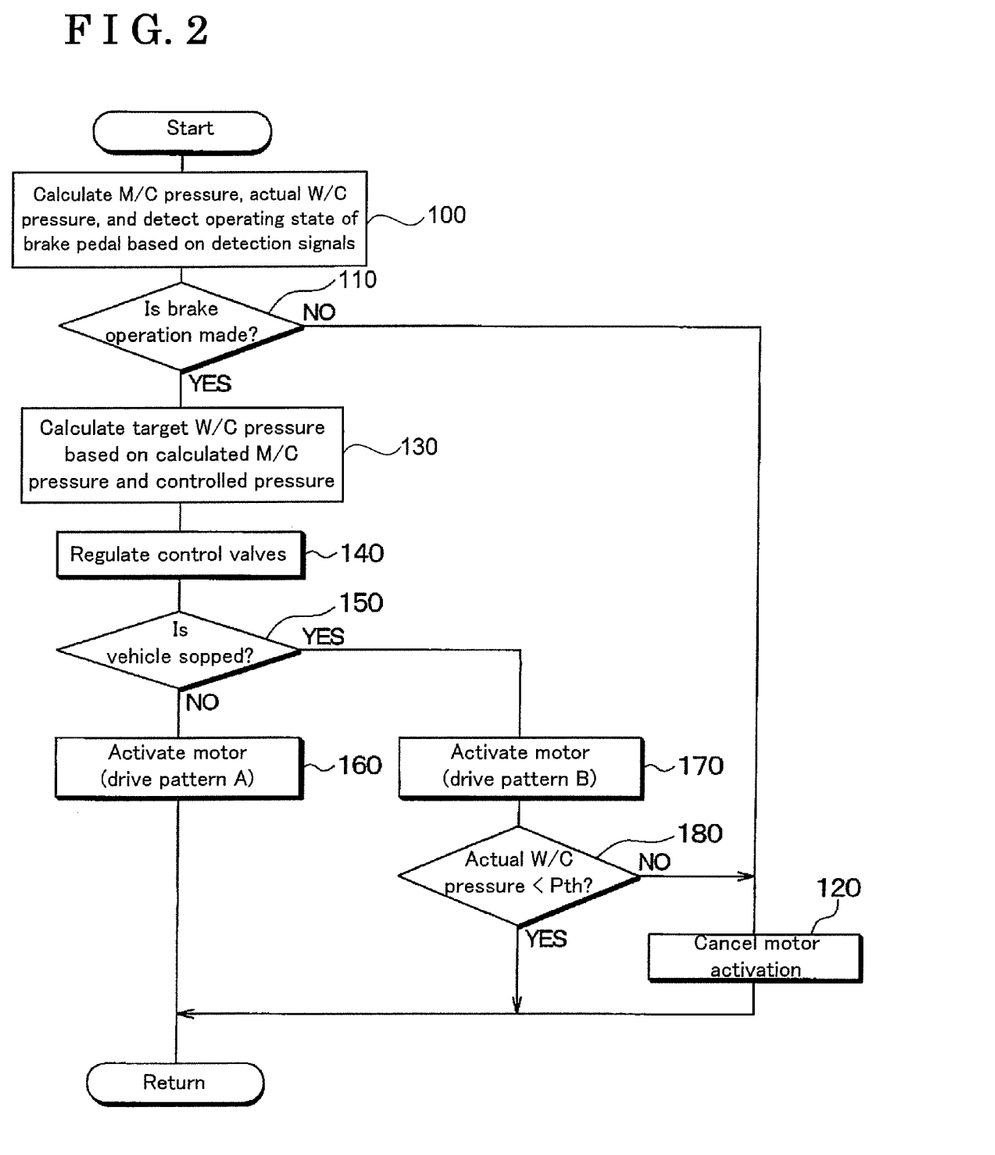
FIG. 2 is a flowchart for regulating a controlled pressure according to the embodiments of the present invention.

According to the second embodiment, in the cases where the motor drive pattern B is selected in step 170 in FIG. 2, the motor 60 is activated on the basis of a difference between the actual W/C pressure calculated in step 100 in FIG. 2, and the target W/C pressure calculated in step 130 based on the M/C pressure obtained on the basis of the detection signal from the M/C pressure sensor 75. Precisely, an activation condition of the motor 60 is defined to be I below, and an activation cancellation condition of the motor 60 is defined to be II below. In this case, α and β correspond to first and second threshold values, respectively, and are each regarded to be a constant stored beforehand in the brake ECU 70. In addition, α is greater than β (i.e., α>β).

I. Activation condition: target W/C pressure≧actual W/C pressure+α; II. Activation cancellation condition: target W/C pressure<actual W/C pressure+β FIG. 5 illustrates a timing chart in the cases where such motor drive pattern B is selected.

Figure 5:
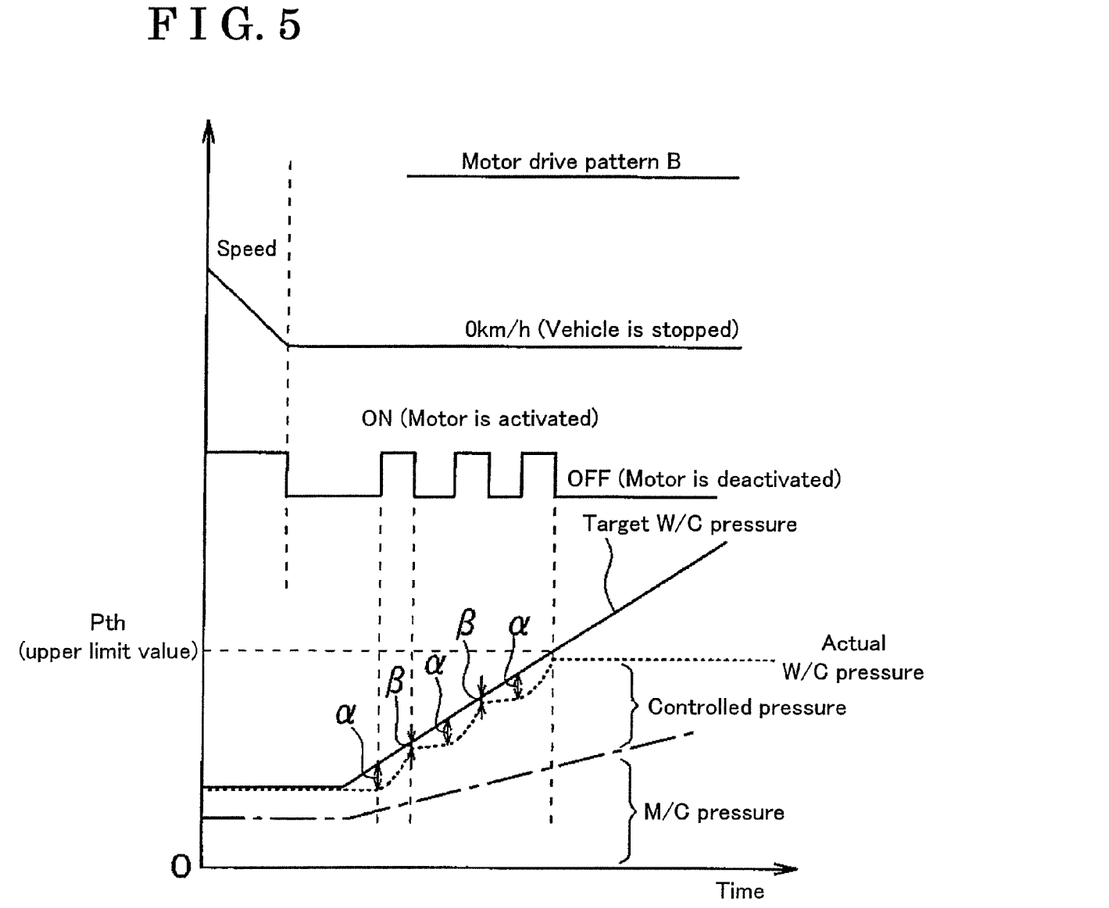
FIG. 5 is a timing chart in the cases where the motor drive pattern B is selected according to the second embodiment of the present invention.

As illustrated in FIG. 5, the motor 60 is activated when a difference between the target W/C pressure and the actual W/C pressure increases to a value of α. After the activation of the motor 60 and when the difference between the target W/C pressure and the actual W/C pressure decreases to a value of β, the activation of the motor 60 is cancelled. The activation of the motor 60 can be controlled on the basis of a difference between the target W/C pressure and the actual W/C pressure, accordingly.

In FIG. 1, the W/C pressure sensors 76 to 79 are provided at the wheels FL, FR, RL, and RR, respectively. In this case, however, at least one W/C pressure sensor may be provided at each brake circuit. In addition, the actual W/C pressure is used for determining whether or not the activation condition and the activation cancellation condition of the motor 60 is satisfied. In this case, all the actual W/C pressures at the wheels FL, FR, RL, and RR can be used for the activation condition and the cancellation condition. Alternatively, at least one of the actual W/C pressures at the wheels FL, FR, RL, and RR or at one brake circuit may be used for the activation condition and the cancellation condition.

Third Embodiment

A third embodiment will be explained below. The third embodiment differs from the first and second embodiments in how to set the motor drive patterns A and B. The other structure of the third embodiment is the same as that of the first and second embodiments and thus only a different point will be explained.

Figure 6A:
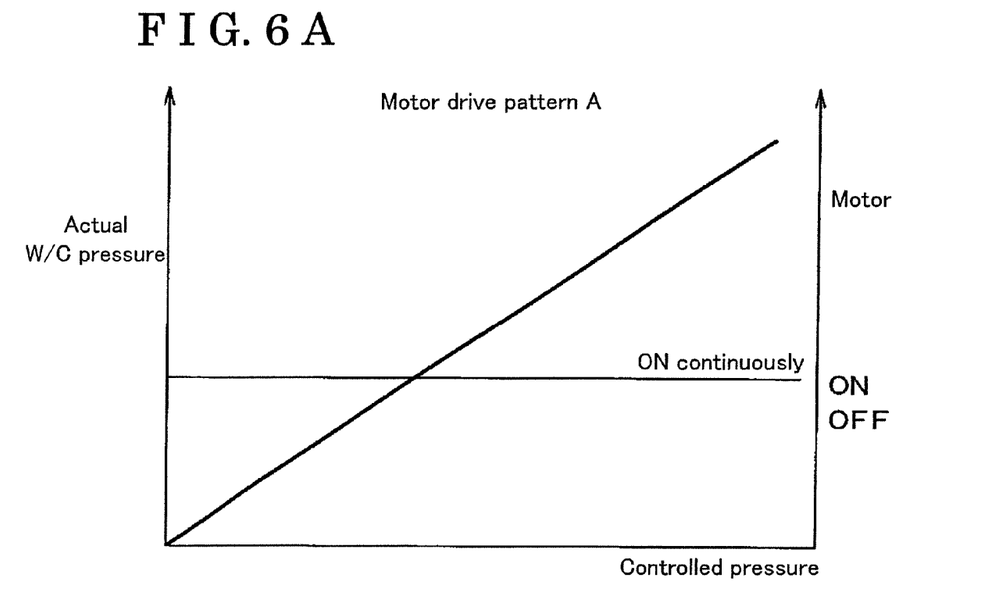
FIG. 6A is a graph illustrating a relationship between an on/off state of the motor relative to the controlled pressure and the actual W/C pressure in the motor drive pattern A according to a third embodiment of the present invention.
Figure 6B:
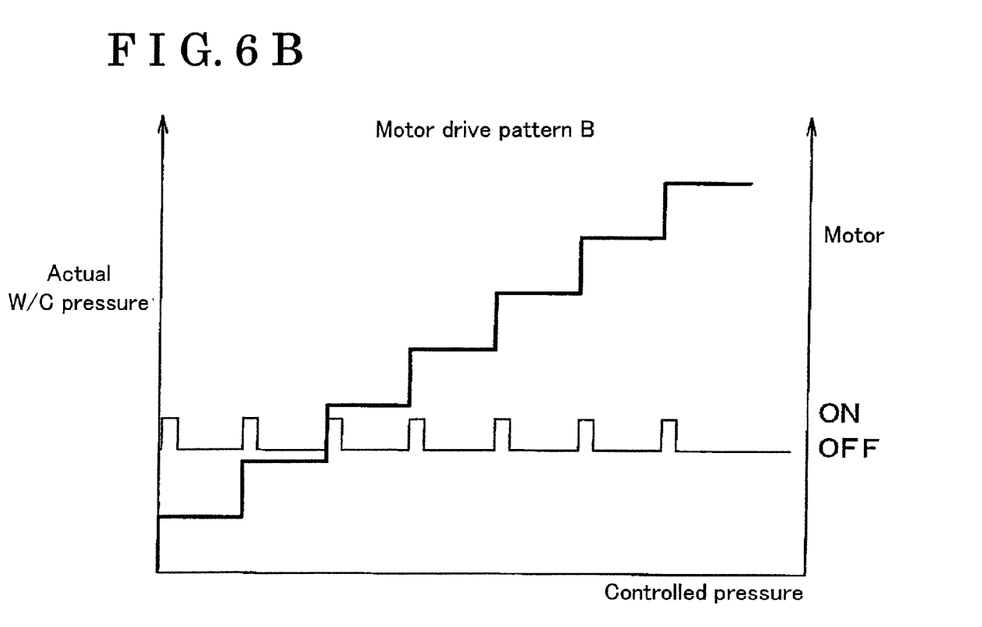
FIG. 6B is a graph illustrating a relationship between an on/off state of the motor relative to the controlled pressure and the actual W/C pressure in the motor drive pattern B according to the third embodiment of the present invention.

As mentioned above, according to the motor drive patterns A and B illustrated in FIGS. 3A and 3B, respectively, the activation of the motor 60 is based on the target W/C pressure. Alternatively, the activation of the motor 60 can be based on the controlled pressure. FIG. 6A is a graph illustrating a relationship between an on/off state of the motor 60 relative to the controlled pressure, and the actual W/C pressure according to the motor drive pattern A. FIG. 6B is a graph illustrating a relationship between an on/off state of the motor 60 relative to the controlled pressure, and the actual W/C pressure according to the motor drive pattern B. In the cases where each motor drive pattern is specified on the basis of the controlled pressure, the same effect of that of the first and second embodiments can be obtained, accordingly.

Other Embodiment

According to the aforementioned first embodiment, the motor 60 is activated on the basis of the same level of change of the controlled pressure in the motor drive pattern B as illustrated in FIG. 3B. At this time, however, the motor 60 may be activated on the basis of any pattern of change of the controlled pressure. In view of avoiding the very stiff brake pedal feel when the driver further depresses the brake pedal 11 or avoiding the deterioration of brake pedal feel, the motor 60 should be frequently activated when the controlled pressure is relatively small. However, in doing so, the number of times the motor 60 is activated may increase. Thus, a pattern of change of the controlled pressure based on which the motor 60 is activated should be determined on the basis of a balance with the increase of current consumption.

According to the aforementioned first embodiment, the brake control system 1 includes the W/C pressure sensors 76 to 79. However, the W/C pressure sensors 76 to 79 may not be necessarily provided. That is, when the W/C pressure sensors are not provided, a difference between the W/C pressure that is estimated on the basis of an activation time of the motor 60, and the M/C pressure may be used to calculate the actual controlled pressure. This is because the activation time of the motor 60 is in proportion to the W/C pressure.

According to the aforementioned first and second embodiments, whether or not the brake operation is performed is determined on the basis of the on/off signal from the stop switch 80. In this case, instead, the M/C pressure sensor 75, a stroke sensor of the brake pedal 11, or the like that can detect the brake operation state may be used.

According to the aforementioned embodiments, the M/C pressure is directly detected on the basis of the detection signal from the M/C pressure sensor 75. In this case, instead, the M/C pressure may be estimated on the basis of the depression force or a stroke of the brake pedal 11, and the like.

According to the aforementioned embodiments, the activation of the motor 60 is terminated when the actual W/C pressure reaches the upper limit value Pth. In this case, instead, the activation of the motor 60 may be terminated when the target W/C pressure reaches its upper limit value.

According to the aforementioned embodiment, as the motor drive pattern when the vehicle is stopped, multiple ranges of the target W/C pressure selected so as not to overlap each other are stored beforehand. The motor 60 is activated when a value of the target W/C pressure falls within one of the multiple ranges. When a value of the target W/C pressure is out of the ranges, the activation of the motor 60 is cancelled. Then, in the cases where the actual W/C pressure reaches the upper limit value Pth, the activation of the motor 60 is terminated. At this time, alternatively, the activation of the motor 60 may be terminated in the cases where the target W/C pressure reaches an upper limit value thereof that is specified for the motor drive pattern when the vehicle is stopped.

According to the aforementioned embodiment, as the motor drive pattern when the vehicle is stopped, multiple ranges of the controlled pressure selected so as not to overlap each other are stored beforehand. The motor 60 is activated when a value of the controlled pressure falls within one of the multiple ranges. When a value of the controlled pressure is out of the ranges, the activation of the motor 60 is cancelled. Then, in the cases where the actual W/C pressure reaches the upper limit value Pth, the activation of the motor 60 is terminated. At this time, alternatively, the activation of the motor 60 may be terminated in the cases where the controlled pressure reaches an upper limit value thereof that is specified for the motor drive pattern when the vehicle is stopped.

Steps illustrated in FIG. 2 correspond to means for performing various processes.

According to the aforementioned embodiments, when the second motor drive pattern B is specified in step 170, the motor 60 is activated in a case where the target wheel cylinder pressure calculated in step 130 falls within one of a plurality of ranges of the target wheel cylinder pressure selected so as not to overlap each other and stored beforehand in the brake ECU 70, and the motor 60 is deactivated in a case where the target wheel cylinder pressure calculated in step 130 is out of the stored ranges of the target wheel cylinder pressure.

Further, according to the aforementioned embodiments, when the second motor drive pattern B is specified in step 170, the motor 60 is started to be activated in a case where the target wheel cylinder pressure calculated in step 130 turns to be equal to one of a plurality of values of the target wheel cylinder pressure different from each other and stored beforehand in the brake ECU 70, and the motor 60 is deactivated in a case where a predetermined time has elapsed after the activation start of the motor 60.

Further, according to the aforementioned embodiments, an actual wheel cylinder pressure actually applied to each of the wheel cylinders 14, 15, 34, and 35 is calculated on the basis of a detection signal from each of the W/C pressure sensors 76 to 79 in step 100, and when the second motor drive pattern B is specified in step 170, the motor 60 is started to be activated in a case where the target wheel cylinder pressure calculated in step 130 turns to be equal to one of a plurality of values of the target wheel cylinder pressure different from each other and stored beforehand in the brake ECU 70, and the motor 60 is deactivated after the activation start of the motor 60 in a case where a difference between the target wheel cylinder pressure calculated in step 130 and the actual wheel cylinder pressure is equal to or less than a predetermined value.

Further, according to the aforementioned embodiments, an actual wheel cylinder pressure actually applied to each of the wheel cylinders 14, 15, 34, and 35 is calculated on the basis of a detection signal from each of the W/C pressure sensors 76 to 79 in step 100, and when the second motor drive pattern B is specified in step 170, the motor 60 is started to be activated in a case where a difference between the target wheel cylinder pressure calculated in step 130 and the actual wheel cylinder pressure calculated on the basis of the detection signal from each of the W/C pressure sensors 76 to 79 in step 100 is equal to or greater than a value α stored beforehand in the brake ECU 70, and the motor 60 is deactivated in a case where the difference between the target wheel cylinder pressure calculated in step 130 and the actual wheel cylinder pressure calculated on the basis of the detection signal from each of the W/C pressure sensors 76 to 79 in step 100 is equal to or smaller than a value β smaller than the value α and stored beforehand in the brake ECU 70.

Further, according to the aforementioned embodiments, when the second motor drive pattern B is specified in step 170, the motor 60 is activated in a case where the controlled pressure calculated in step 130 falls within one of a plurality of ranges of the controlled pressure selected so as not to overlap each other and stored beforehand in the brake ECU 70, and the motor 60 is deactivated in a case where the controlled pressure calculated in step 30 is out of the stored ranges of the controlled pressure.

Further, according to the aforementioned embodiments, when the second motor drive pattern B is specified in step 170, the motor 60 is started to be activated in a case where the controlled pressure calculated in step 130 turns to be equal to one of a plurality of values of the controlled pressure different from each other and stored beforehand in the brake ECU 70, and the motor 60 is deactivated in a case where a predetermined time has elapsed after the activation start of the motor 60.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:
1. A brake control apparatus for a vehicle, comprising:
first calculating means for calculating a master cylinder pressure generated at a master cylinder in response to a brake operation of a vehicle;
first determining means for determining whether or not the brake operation is performed;

second calculating means for calculating a target wheel cylinder pressure applied to a wheel cylinder based on the master cylinder pressure calculated by the first calculating means;

third calculating means for calculating a controlled pressure applied to the wheel cylinder in addition to the master cylinder pressure based on the master cylinder pressure calculated by the first calculating means and the target wheel cylinder pressure calculated by the second calculating means;

controlling means for controlling a pressure difference control valve arranged between the master cylinder and the wheel cylinder based on the controlled pressure calculated by the third calculating means in a case where the first determining means determines that the brake operation is performed;

second determining means for determining whether or not the vehicle is stopped; and driving means for specifying a drive pattern of a motor to a first motor drive pattern by which the motor is continuously activated in a case where the second determining means determines that the vehicle is not stopped, the motor driving a pump for discharging a brake fluid between the pressure difference control valve and the wheel cylinder, the driving means specifying the drive pattern to a second motor drive pattern by which the motor is alternately activated and deactivated in a case where the second determining means determines that the vehicle is stopped, the driving means driving the motor based on the motor driving pattern specified, wherein when the driving means specifies the second motor drive pattern, the driving means activates the motor in a case where the target wheel cylinder pressure calculated by the second calculating means falls within one of a plurality of ranges of the target wheel cylinder pressure selected so as not to overlap each other and stored beforehand by the driving means, and deactivates the motor in a case where the target wheel cylinder pressure calculated by the second calculating means is out of the stored ranges of the target wheel cylinder pressure.

2. A brake control apparatus for a vehicle, comprising:

first calculating means for calculating a master cylinder pressure generated at a master cylinder in response to a brake operation of a vehicle;

first determining means for determining whether or not the brake operation is performed;

second calculating means for calculating a target wheel cylinder pressure applied to a wheel cylinder based on the master cylinder pressure calculated by the first calculating means;

third calculating means for calculating a controlled pressure applied to the wheel cylinder in addition to the master cylinder pressure based on the master cylinder pressure calculated by the first calculating means and the target wheel cylinder pressure calculated by the second calculating means;

controlling means for controlling a pressure difference control valve arranged between the master cylinder and the wheel cylinder based on the controlled pressure calculated by the third calculating means in a case where the first determining means determines that the brake operation is performed;

second determining means for determining whether or not the vehicle is stopped; and driving means for specifying a drive pattern of a motor to a first motor drive pattern by which the motor is continuously activated in a case where the second determining means determines that the vehicle is not stopped, the motor driving a pump for discharging a brake fluid between the pressure difference control valve and the wheel cylinder, the driving means specifying the drive pattern to a second motor drive pattern by which the motor is alternately activated and deactivated in a case where the second determining means determines that the vehicle is stopped, the driving means driving the motor based on the motor driving pattern specified, wherein when the driving means specifies the second motor drive pattern, the driving means starts to activate the motor in a case where the target wheel cylinder pressure calculated by the second calculating means turns to be equal to one of a plurality of values of the target wheel cylinder pressure different from each other and stored beforehand by the driving means, and deactivates the motor in a case where a predetermined time has elapsed after the activation start of the motor.

3. A brake control apparatus for a vehicle, comprising:

first calculating means for calculating a master cylinder pressure generated at a master cylinder in response to a brake operation of a vehicle;

first determining means for determining whether or not the brake operation is performed;

second calculating means for calculating a target wheel cylinder pressure applied to a wheel cylinder based on the master cylinder pressure calculated by the first calculating means;

third calculating means for calculating a controlled pressure applied to the wheel cylinder in addition to the master cylinder pressure based on the master cylinder pressure calculated by the first calculating means and the target wheel cylinder pressure calculated by the second calculating means;

controlling means for controlling a pressure difference control valve arranged between the master cylinder and the wheel cylinder based on the controlled pressure calculated by the third calculating means in a case where the first determining means determines that the brake operation is performed;

second determining means for determining whether or not the vehicle is stopped;

driving means for specifying a drive pattern of a motor to a first motor drive pattern by which the motor is continuously activated in a case where the second determining means determines that the vehicle is not stopped, the motor driving a pump for discharging a brake fluid between the pressure difference control valve and the wheel cylinder, the driving means specifying the drive pattern to a second motor drive pattern by which the motor is alternately activated and deactivated in a case where the second determining means determines that the vehicle is stopped, the driving means driving the motor based on the motor driving pattern specified; and fourth calculating means for calculating an actual wheel cylinder pressure actually applied to the wheel cylinder, wherein when the driving means specifies the second motor drive pattern, the driving means starts to activate the motor in a case where the target wheel cylinder pressure calculated by the second calculating means turns to be equal to one of a plurality of values of the target wheel cylinder pressure different from each other and stored beforehand by the driving means, and deactivates the motor after the activation start of the motor in a case where a difference between the target wheel cylinder pressure calculated by the second calculating means and the actual wheel cylinder pressure is equal to or less than a predetermined value.

4. A brake control apparatus for a vehicle, comprising:
first calculating means for calculating a master cylinder pressure generated at a master cylinder in response to a brake operation of a vehicle;
first determining means for determining whether or not the brake operation is performed;
second calculating means for calculating a target wheel cylinder pressure applied to a wheel cylinder based on the master cylinder pressure calculated by the first calculating means;
third calculating means for calculating a controlled pressure applied to the wheel cylinder in addition to the master cylinder pressure based on the master cylinder pressure calculated by the first calculating means and the target wheel cylinder pressure calculated by the second calculating means;
controlling means for controlling a pressure difference control valve arranged between the master cylinder and the wheel cylinder based on the controlled pressure calculated by the third calculating means in a case where the first determining means determines that the brake operation is performed;
second determining means for determining whether or not the vehicle is stopped;
driving means for specifying a drive pattern of a motor to a first motor drive pattern by which the motor is continuously activated in a case where the second determining means determines that the vehicle is not stopped, the motor driving a pump for discharging a brake fluid between the pressure difference control valve and the wheel cylinder, the driving means specifying the drive pattern to a second motor drive pattern by which the motor is alternately activated and deactivated in a case where the second determining means determines that the vehicle is stopped, the driving means driving the motor based on the motor driving pattern specified; and
fourth calculating means for calculating an actual wheel cylinder pressure actually applied to the wheel cylinder, wherein when the driving means specifies the second motor drive pattern, the driving means starts to activate the motor in a case where a difference between the target wheel cylinder pressure calculated by the second calculating means and the actual wheel cylinder pressure calculated by the fourth calculating means is equal to or greater than a first threshold value stored beforehand by the driving means, and deactivates the motor in a case where the difference between the target wheel cylinder pressure calculated by the second calculating means and the actual wheel cylinder pressure calculated by the fourth calculating means is equal to or smaller than a second threshold value smaller than the first threshold value and stored beforehand by the driving means.

5. A brake control apparatus for a vehicle, comprising:
first calculating means for calculating a master cylinder pressure generated at a master cylinder in response to a brake operation of a vehicle;
first determining means for determining whether or not the brake operation is performed;
second calculating means for calculating a target wheel cylinder pressure applied to a wheel cylinder based on the master cylinder pressure calculated by the first calculating means;
third calculating means for calculating a controlled pressure applied to the wheel cylinder in addition to the master cylinder pressure based on the master cylinder pressure calculated by the first calculating means and the target wheel cylinder pressure calculated by the second calculating means;
controlling means for controlling a pressure difference control valve arranged between the master cylinder and the wheel cylinder based on the controlled pressure calculated by the third calculating means in a case where the first determining means determines that the brake operation is performed;
second determining means for determining whether or not the vehicle is stopped; and
driving means for specifying a drive pattern of a motor to a first motor drive pattern by which the motor is continuously activated in a case where the second determining means determines that the vehicle is not stopped, the motor driving a pump for discharging a brake fluid between the pressure difference control valve and the wheel cylinder, the driving means specifying the drive pattern to a second motor drive pattern by which the motor is alternately activated and deactivated in a case where the second determining means determines that the vehicle is stopped, the driving means driving the motor based on the motor driving pattern specified,
wherein when the driving means specifies the second motor drive pattern, the driving means activates the motor in a case where the controlled pressure calculated by the third calculating means falls within one of a plurality of ranges of the controlled pressure selected so as not to overlap each other and stored beforehand by the driving means, and deactivates the motor in a case where the controlled pressure calculated by the third calculating means is out of the stored ranges of the controlled pressure.

6. A brake control apparatus for a vehicle, comprising:
first calculating means for calculating a master cylinder pressure generated at a master cylinder in response to a brake operation of a vehicle;
first determining means for determining whether or not the brake operation is performed;
second calculating means for calculating a target wheel cylinder pressure applied to a wheel cylinder based on the master cylinder pressure calculated by the first calculating means;
third calculating means for calculating a controlled pressure applied to the wheel cylinder in addition to the master cylinder pressure based on the master cylinder pressure calculated by the first calculating means and the target wheel cylinder pressure calculated by the second calculating means;
controlling means for controlling a pressure difference control valve arranged between the master cylinder and the wheel cylinder based on the controlled pressure calculated by the third calculating means in a case where the first determining means determines that the brake operation is performed;
second determining means for determining whether or not the vehicle is stopped; and
driving means for specifying a drive pattern of a motor to a first motor drive pattern by which the motor is continuously activated in a case where the second determining means determines that the vehicle is not stopped, the motor driving a pump for discharging a brake fluid between the pressure difference control valve and the wheel cylinder, the driving means specifying the drive pattern to a second motor drive pattern by which the motor is alternately activated and deactivated in a case where the second determining means determines that the vehicle is stopped, the driving means driving the motor based on the motor driving pattern specified, wherein when the driving means specifies the second motor drive pattern, the driving means starts to activate the motor in a case where the controlled pressure calculated by the third calculating means turns to be equal to one of a plurality of values of the controlled pressure different from each other and stored beforehand by the driving means, and deactivates the motor in a case where a predetermined time has elapsed after the activation start of the motor.

* * * * *